(12) United States Patent
Armand et al.

(10) Patent No.: US 10,998,691 B2
(45) Date of Patent: May 4, 2021

(54) METHOD AND SYSTEM FOR ADJUSTING THE PROFILE OF A LASER WAVEFRONT

(71) Applicants: COMPAGNIE INDUSTRIELLE DES LASERS CILAS, Orléans (FR); CENTRE NATIONAL DE LA RECHERCHE SCIENTIFIQUE (CNRS), Paris (FR); UNIVERSITÉ DE LIMOGES, Limoges (FR)

(72) Inventors: Paul Armand, Limoges (FR); Jérémy Saucourt, Limoges (FR); Vincent Kermene, Aixe-sur-Vienne (FR); Agnès Desfarges-Berthelemot, Couzeix (FR); Joël Benoist, Limoges (FR); Alain Barthelemy, Limoges (FR); Julien Leval, Saint-Pryvé-Saint-Mesmin (FR)

(73) Assignees: COMPAGNIE INDUSTRIELLE DES LASERS CILAS, Orléans (FR); CENTRE NATIONAL DE LA RECHERCHE SCIENTIFIQUE (CNRS), Paris (FR); UNIVERSITÉ DE LIMOGES, Limoges (FR)

( * ) Notice: Subject to any disclaimer, the term of this patent is extended or adjusted under 35 U.S.C. 154(b) by 352 days.

(21) Appl. No.: 16/250,734

(22) Filed: Jan. 17, 2019

(65) Prior Publication Data

US 2019/0221992 A1  Jul. 18, 2019

(30) Foreign Application Priority Data

Jan. 18, 2018 (FR) ...................................... 1800066

(51) Int. Cl.
*G02F 1/01* (2006.01)
*H01S 3/13* (2006.01)
*H01S 3/23* (2006.01)
*H01S 3/10* (2006.01)

(52) U.S. Cl.
CPC ........ *H01S 3/1305* (2013.01); *H01S 3/10053* (2013.01); *H01S 3/1303* (2013.01); *H01S 3/1307* (2013.01); *H01S 3/2308* (2013.01); *H01S 3/2383* (2013.01)

(58) Field of Classification Search
CPC combination set(s) only.
See application file for complete search history.

(56) References Cited

U.S. PATENT DOCUMENTS

2017/0201063 A1* 7/2017 Bourderionnet ...... H01S 3/2383

* cited by examiner

*Primary Examiner* — Joseph P Martinez
(74) *Attorney, Agent, or Firm* — Christensen O'Connor Johnson Kindness PLLC (57) ABSTRACT

A method and system for adjusting the profile of a laser wavefront formed by at least a laser beam to a desired laser wavefront profile, the laser beam or beams presenting random phases and intensities, comprises a mixing module, configured to generate, from interference phenomena among the laser beam or beams, a laser field, a second intensity measuring module configured to measure the mixed intensities of the laser field portions, a calculation unit configured to calculate one or several phase correction values of the phase of the laser beam or the phases of laser beams, from the intensities of the laser beams, the mixed intensities and one or several predetermined target phases, and a phase adjustment module configured to apply the phase correction value or values obtained from the calculation unit to the laser beam phases.

16 Claims, 4 Drawing Sheets

METHOD AND SYSTEM FOR ADJUSTING THE PROFILE OF A LASER WAVEFRONT

TECHNICAL FIELD

The present disclosure concerns a method and a laser system for the adjustment of any laser wavefront profile formed of one or several laser beams to a desired laser wavefront profile.

BACKGROUND

In order to generate high power laser sources, most current systems rely on the coherent combination of a large number of laser beams of the same frequency and same phase. However, laser beams cannot follow strictly identical optical paths, and phase differences occur among the laser beam phases. To solve this problem, some systems are based on a "Master Oscillator Power Amplifier" (hereinafter described as "MOPA") architecture, wherein the master oscillator generates a master laser beam, which is split into a plurality of laser beams that are then amplified by amplifiers. Upstream from these amplifiers, there are phase modulators that modify the phase of the beams. Downstream from these amplifiers, there is a detection device that is sensitive to the phase of the laser beams. The information produced by the detection device is then supplied to the phase modulators. These systems therefore comprise a phase-locked loop able to correct the deviations between the phases of laser beams due to differences in the optical paths.

Document WO2016062942 discloses a method for generating a high laser power based on a phase-locked loop comprising a detection device relying on filtering by phase contrast. This method enables to adjust, in an iterative manner, the phase of each laser beam to an identical phase value. This method is therefore particularly efficient to generate a planar laser wavefront.

However, taking into account the environment through which the laser beam travels is an important aspect when generating a high power laser beam, especially in astrophysics applications. Indeed, the environment in which laser beams evolve is an added source of disruption. The laser beams therefore form a random laser wavefront profile, the adjustment of which to a desired laser wavefront profile is a complex task.

SUMMARY

Disclosed herein is a method for adjusting a laser wavefront, comprising iterative succession of the following steps:
  a step of mixing the laser beam or beams, implemented by a mixing module, consisting of generating, from interference phenomena between the laser beam or beams, a laser field forming a second laser wavefront;
  a step of measuring intensities, implemented by an intensity measuring module, consisting of measuring the mixed intensities of the laser field comprising laser field portions;
  a phase correction calculation step, implemented by a calculation unit, consisting of calculating one or several phase correction values of the phase of the laser beam or the phases of the laser beams, from the intensities of the laser beam or beams, from the mixed intensities measured at the step of measuring intensities, and from one or several predetermined target phases forming the desired laser wavefront profile; and
  a phase adjustment step, implemented by a phase adjustment module, consisting of applying the phase correction value or values, obtained in the phase correction calculation step, to the phase of the laser beam or to the phases of the laser beams, in order to adjust the first laser wavefront profile to the desired laser wavefront profile.

The present disclosure also concerns a system for adjusting the profile of a laser wavefront formed by at least one laser beam, to a desired laser wavefront profile, the laser beam or beams presenting random phases and intensities, and the laser wavefront formed by the laser beam or beams presenting a first laser wavefront.

According to the disclosure, the system comprises:
  a mixing module, configured to generate, from interference phenomena between the laser beam or beams, a laser field forming a second laser wavefront;
  an intensity measuring module, configured to measure mixed intensities of the laser field comprising laser field portions;
  a calculation unit, configured to calculate one or several phase correction values of the phase of the laser beam or the phases of the laser beams, from the intensities of the laser beam or beams, from the mixed intensities measured by the intensity measuring module, and from one or several predetermined target phases forming the profile of the desired laser wavefront profile; and
  a phase adjustment module, configured to apply the phase correction value or values, obtained by the calculation unit, to the phase of the laser beam or to the phases of the laser beams, in order to adjust the profile of the first laser wavefront to the desired laser wavefront profile.

BRIEF DESCRIPTION OF THE DRAWINGS

The disclosure is better understood, and other purposes, details, characteristics and advantages of this disclosure will become clearer upon reading the following detailed explanatory description relating to the embodiments of the disclosure, provided as examples and not limited thereto, and with reference to the appended schematic drawings. In these drawings.

In these drawings, identical references describe similar elements.

DETAILED DESCRIPTION

The present disclosure has for subject matter to overcome known disadvantages, in certain aspects, by way of a method for adjusting the profile of a laser wavefront formed by at least one laser beam to a desired laser wavefront profile, the laser beam or laser beams presenting random phases and intensities, and the laser wavefront formed by the beam or beams representing a first laser wavefront.

For this purpose, the method for adjusting a laser wavefront profile (hereinafter described as "method") is remarkable in that in comprises the iterative succession of the following steps:
- a step of mixing the laser beam or beams, implemented by a mixing module, consisting of generating, from interference phenomena between the laser beam or beams, a laser field forming a second laser wavefront;
- a step of measuring intensities, implemented by an intensity measuring module, consisting of measuring the mixed intensities of the laser field comprising laser field portions;
- a phase correction calculation step, implemented by a calculation unit, consisting of calculating one or several phase correction values of the phase of the laser beam or the phases of the laser beams, from the intensities of the laser beam or beams, from the mixed intensities measured at the step of measuring intensities, and from one or several predetermined target phases forming the desired laser wavefront profile; and
- a phase adjustment step, implemented by a phase adjustment module, consisting of applying the phase correction value or values, obtained in the phase correction calculation step, to the phase of the laser beam or to the phases of the laser beams, in order to adjust the first laser wavefront profile to the desired laser wavefront profile.

Thus, thanks to the disclosure, it is possible to indirectly determine the profile of the laser wavefront formed by one or several laser beams and to lock the phase of the laser beam or the phases of these laser beams in a set of predetermined target phases that defines a desired laser wavefront profile. A laser wavefront profile adjusted to this desired laser wavefront profile is produced, enabling for example, to pre-compensate the disturbances affecting the wavefront as it passes through a certain environment, in order to produce a laser source with optimal power.

Advantageously, the phase correction calculation step comprises the following successive sub-steps:
- a first allocation sub-step, implemented by a first allocation sub-module, consisting, in order to form a target laser wavefront, to allocate the predetermined target phase or phases to the laser beam or beams;
- a first calculation sub-step, implemented by a first calculation sub-module, consisting of calculating a target image laser wavefront of a target image laser field comprising target image portions, from the target laser wavefront and a mixing matrix characterising the mixing module, in order to obtain the target image phases associated with the target image portions;
- a second allocation sub-step, implemented by a second allocation sub-module, consisting of allocating the target image phases to the laser field portions whose mixed intensities are measured in the intensity measuring step, in order to form an image laser wavefront;
- a convergence sub-step, implemented in an iterative manner by a convergence sub-module, consisting of obtaining, by convergence, the theoretical image phases, from the target image phases and the mixed intensities, then to allocate said theoretical image phases to the laser field portions in order to form a theoretical image laser wavefront;
- a second calculation sub-step, implemented by a second calculation sub-module, consisting of calculating a theoretical laser wavefront, from the theoretical image laser wavefront and a generalized inverse of the mixing matrix, in order to determine one or several theoretical phases associated with one or several theoretical laser beams forming the theoretical laser wavefront; and
- an estimation sub-step, implemented by the estimation sub-module, consisting of estimating one or several phase correction values, corresponding to the difference between the target phase or phases and the theoretical phase or phases.

In one embodiment, the convergence sub-step, implemented by the convergence sub-module, consists of implementing a projection method comprising an iterative succession of the following steps:
- a determination step, implemented by a determination element, consisting of determining a projected laser wavefront of a projected laser field, comprising projected portions, from the image laser wavefront, the mixing matrix and the generalized inverse of the mixing matrix, in order to obtain projected phases associated with the projected portions;
- a test step, implemented by a test element, consisting of testing the deviation between the projected phases and the target image phases, and in producing a representative signal that is:
- either in a first state, if the deviation is greater than a predetermined threshold value;
- or in a second state, if the deviation is equal to or smaller than the predetermined threshold value;
- a decision step, implemented by a decision element, consisting:
- if the produced signal presents itself in the first state, of replacing, in the determination step of the subsequent iteration, the target image phases with the projected phases; or
- if the produced signal is in the second state, of considering the projected phases as theoretical image phases to be allocated to the laser field portions to form the theoretical image laser wavefront.

Furthermore, the method comprises a calibration step, implemented by a calibration module, consisting of determining the intensities of the laser beam or beams forming the first laser wavefront.

In a particular embodiment, the method also comprises a laser beam generation step, implemented by a laser beam generator, consisting of generating a master laser beam, the laser beam generation step occurring before a step whereby the beam is split, implemented by a laser beam splitter, consisting of splitting the master laser beam into one or several elementary laser beams forming the first laser wavefront.

Furthermore, in one embodiment, the method also comprises an amplification step, implemented by an amplification module, consisting of amplifying the elementary laser beam or beams.

Advantageously, the method also comprises a sampling step, implemented by a sampling module, consisting of sampling a part of the elementary laser beam or beams forming the first wavefront, said sampled part of the elementary laser beam or beams representing the laser beam or beams forming a wavefront representative of the first laser wavefront.

The present disclosure also concerns a system for adjusting the profile of a laser wavefront (hereinafter described as "system") formed by at least one laser beam, to a desired laser wavefront profile, the laser beam or beams presenting random phases and intensities, and the laser wavefront formed by the laser beam or beams presenting a first laser wavefront.

According to the disclosure, the system comprises:
- a mixing module, configured to generate, from interference phenomena between the laser beam or beams, a laser field forming a second laser wavefront;
- an intensity measuring module, configured to measure mixed intensities of the laser field comprising laser field portions;
- a calculation unit, configured to calculate one or several phase correction values of the phase of the laser beam or the phases of the laser beams, from the intensities of the laser beam or beams, from the mixed intensities measured by the intensity measuring module, and from one or several predetermined target phases forming the profile of the desired laser wavefront profile; and
- a phase adjustment module, configured to apply the phase correction value or values, obtained by the calculation unit, to the phase of the laser beam or to the phases of the laser beams, in order to adjust the profile of the first laser wavefront to the desired laser wavefront profile.

Advantageously, the calculation unit comprises the following modules:
- a first allocation sub-module, configured to allocate the predetermined target phase or phases to the laser beam or beams of intensities, in order to form a target laser wavefront:
- a first calculation sub-module, configured to calculate a target image laser wavefront of a target image laser field comprising target image portions, from the target laser wavefront and a mixing matrix, to obtain the target image phases associated with the target image portions;
- a second allocation sub-module configured to allocate target image phases to the laser field portions whose mixed intensities are measured by the intensity measuring module, in order to form an image laser wavefront;
- a convergence sub-module, configured to obtain, by convergence, theoretical image phases, from the target image phases and the mixed intensities, and to allocate said theoretical image phases to the laser field portions in order to form a theoretical image laser wavefront;
- a second calculation sub-module, configured to calculate a theoretical laser wavefront, from the theoretical image laser wavefront and a generalized inverse of the mixing matrix, in order to determine one or several theoretical phases associated with one or several theoretical laser beams forming the theoretical laser wavefront; and
- an estimation sub-module, configured to estimate one or several phase correction values, corresponding to the difference between the target phase or phases and the theoretical phase or phases.

In a particular embodiment, the convergence sub-module is configured to implement a projection method, said convergence sub-module comprising:
- a determination element, configured to determine a projected laser wavefront of a projected laser field, comprising projected portions, from the image laser wavefront, the mixing matrix and the generalized inverse of the mixing matrix, in order to obtain projected phases associated with the projected portions;
- a test element, configured to test the deviation between the projected phases and the target image phases, and to emit a representative signal presenting itself:
  either in a first state, if the deviation is greater than a predetermined threshold value;
  or in a second state, if the deviation is smaller than or equal to the predetermined threshold value;
- a decision element, configured:
  if the received signal is in the first state, to replace, in the determination module, the target image phases with the projected phases; or
  if the received signal is in the second state, to consider the projected phases as theoretical image phases to be allocated to the laser field portions to form the theoretical image laser wavefront.

Furthermore, the system comprises a calibration module configured to determine the intensities of the laser beam or beams forming the first laser wavefront.

In one embodiment, the system comprises a laser beam generator configured to generate a master laser beam and a laser beam splitter configured to split said master laser beam into one or several elementary laser beams forming the first laser wavefront.

Furthermore, advantageously, the system has an amplification module of the elementary laser beam or beams, and a sampling module, said sampling module being configured to sample a part of the elementary laser beam or beams forming the first wavefront, said sampled part of the elementary laser beam or beams representing the laser beam or beams forming a laser wavefront representative of the first laser wavefront.

Furthermore, the intensity measuring module comprises a number of photodetectors at least three times greater than the number of laser beams.

In a particular embodiment, the intensity measuring module is integrated in the mixing module.

Furthermore, the mixing module comprises a diffracting element, a refracting element, one or a plurality of diffusing elements, or a combination of these elements.

Figure 1:
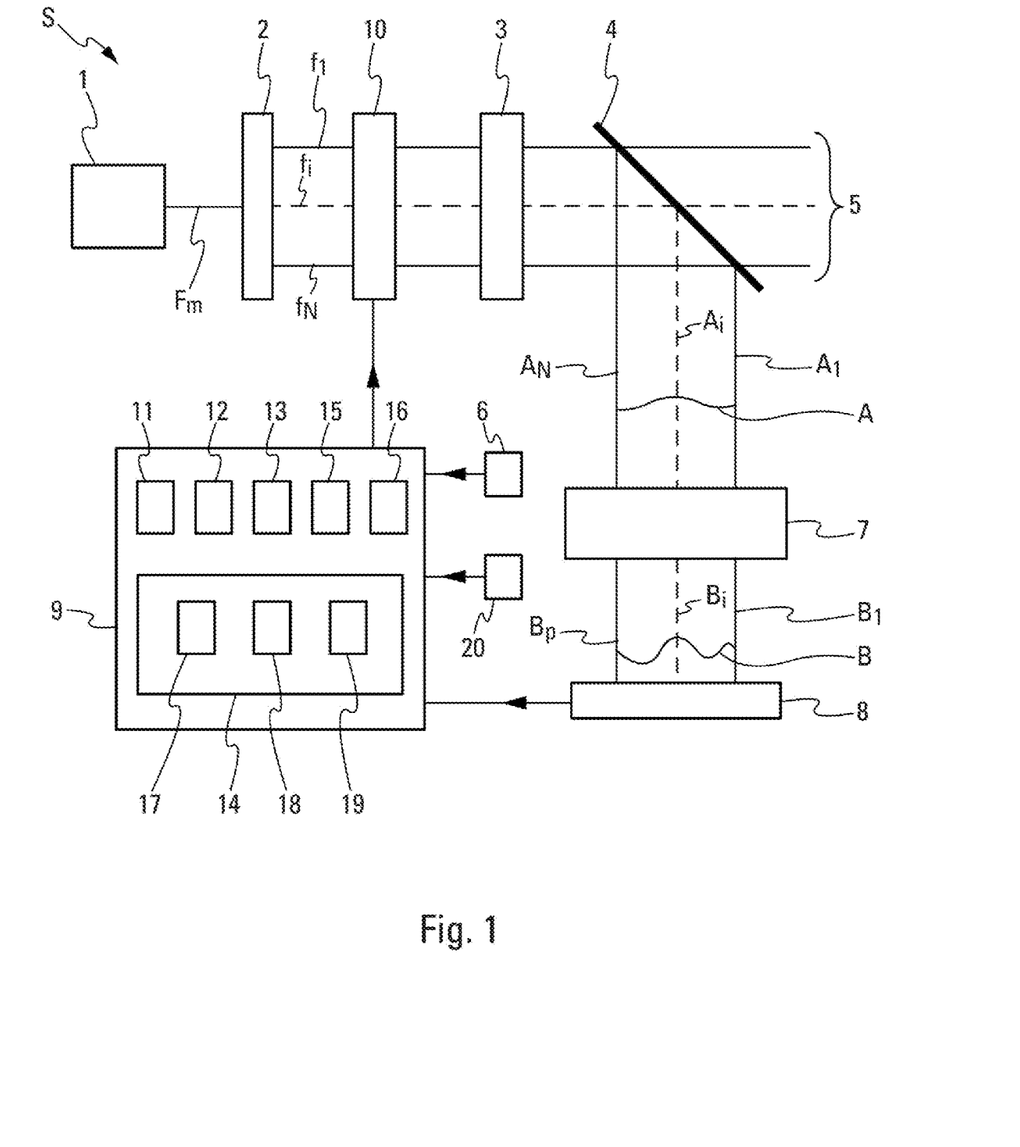
FIG. 1 is a synoptic scheme of an embodiment of the system.

The system S, of which an embodiment is schematically represented in FIG. 1, is intended to adjust any random laser wavefront profile formed by one or several laser beams to a desired laser wavefront profile represented by a set of predetermined target phases.

The term laser beam can be used to describe a part of a laser beam generated by a laser beam generator or the laser beam itself.

In the context of the present disclosure, the laser system S of FIG. 1 has an adjustment loop of a laser wavefront profile, formed by at least one laser beam $A_i$ (with i=1, 2, . . . , N) presenting one or several random phases $\varphi_i$ and intensities $a_i$, by counter-reaction. The adjustment loop has:
- a mixing module 7 comprising one or several mixing elements, which induce interference phenomena among the laser beam or beams $A_i$. The interference phenomena generate a laser field forming a laser wavefront B, whose intensity profile depends on the phase differences between the laser beam or beams $A_i$;
- an intensity measuring module 8 arranged downstream from the mixing module 7, which measures the intensities $b_i$ of the laser field (hereinafter described as "mixed intensities"), the laser beam being sampled in laser field portions $B_i$ (with i=1, 2, . . . , P);
- a phase correction calculation unit 9 that calculates the phase correction value or values $\varphi_i^{cor}$, from the intensities $a_i$ and the mixed intensities $b_i$ measured by the intensity measuring module 8, as well as the predetermined target phase or phase $\varphi_i^c$ representing the desired laser wavefront profile; and
- a phase adjustment module 10, arranged between the laser beam splitter 2 and the amplification module 3, that applies the phase correction value or values $\varphi_i^{cor}$, obtained from the calculation unit 9, to the phase $\varphi_i$ of the laser beam $A_i$ or to the phases $\varphi_i$ of the laser beams $A_i$ to adjust the laser wavefront profile A to the desired laser wavefront represented by the set of predetermined target phases $\varphi_i^c$.

In a particular embodiment, the system comprises a calibration module 6. This calibration module 6 can, by way of example, be a memory unit comprising predetermined intensity values $a_i$ (see FIG. 1) that are transferred to the calculation module 9. The values of the intensities $a_i$ can represent some characteristics of the laser beams, provided by the manufacturer of laser beams. Furthermore, the intensities $a_i$, representing the square module of a laser field representative of the laser beam or beams $A_i$, can have identical values if it is assumed that the laser beams $A_i$ are of comparable power.

Alternatively, the calibration module 6 can comprise one or several photodiodes. The photodiode or photodiodes are arranged on the path of the laser beam or beams $A_i$ and measure intensities $a_i$ of which a representative signal is sent to the calculation unit 9.

Furthermore, by way of example, the set of predetermined target phases $\varphi_i^c$ can be supplied by a memory element 20 to the calculation unit 9.

The mixing module 7, which can be in two or three dimensions, generates a cover, over a short distance, of the laser beam or beams $A_i$. This cover can be partial or total. It generates interference phenomena among the laser beam or beams $A_i$. The laser field that results from these interference phenomena forms a laser wavefront B. Information representative of the wavefront B is linked to information representative of the laser wavefront A through the relation B=M.A. In this relation, B is a vector of dimension P (P representing the number of laser field portions) representative of the laser wavefront B, A is a vector of dimension N (N representing the number of laser beams $A_i$) representative of the laser wavefront A, and M is a mixing matrix of dimension P×N, which characterises in particular the mixing module 7.

Figure 2:
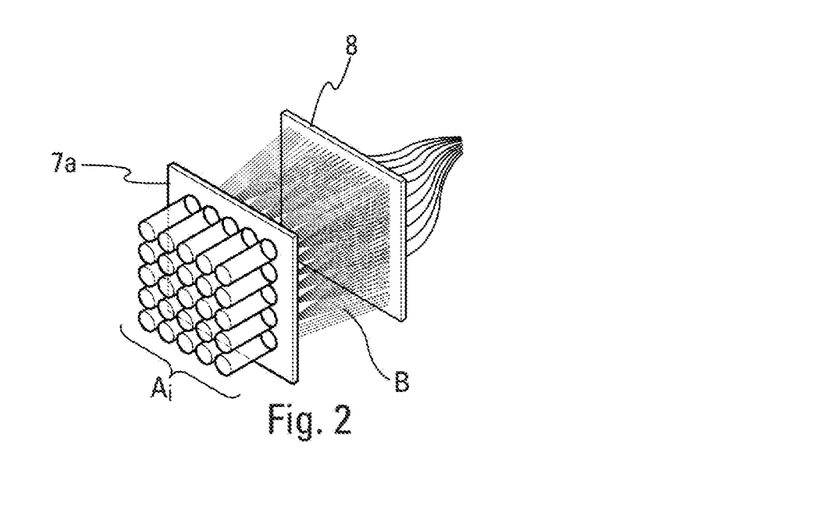
FIG. 2 represents a mixing module and an intensity measuring module according to a first embodiment of the system.

In a first embodiment, such as represented in FIG. 2, the mixing module 7 comprises an element 7a representing a diffracting component. By way of example, the element 7a is a plate through which openings are drilled, their positions on the plate corresponding to the positions of the centroids of the laser beams $A_i$.

Figure 3:
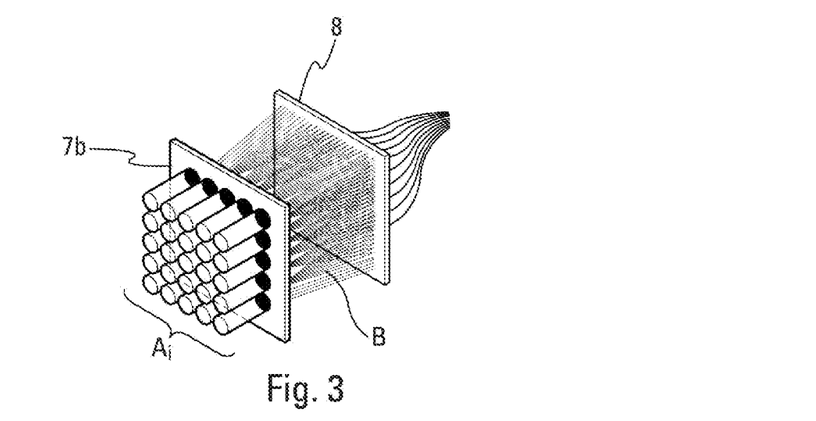
FIG. 3 represents a mixing module and an intensity measuring module according to a second embodiment of the system.

In a second embodiment, such as represented in FIG. 3, the mixing module 7 comprises an element 7b representing a refracting component, for example a matrix of prisms or lenses.

Figure 4:
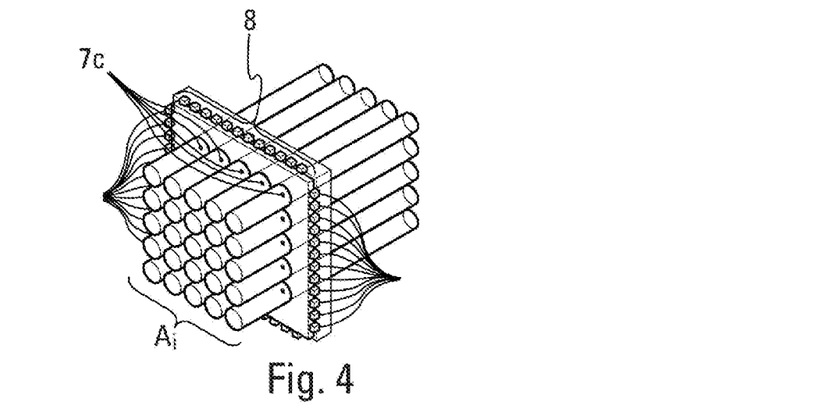
FIG. 4 represents a mixing module and an intensity measuring module according to a third embodiment of the disclosure.

In a third embodiment, such as represented in FIG. 4, the mixing module 7 comprises a set of elements 7c representing diffracting components arranged on a substrate. The position of each diffracting component corresponds to the centroid of each beam $A_i$.

As a variant (not represented), the mixing module 7 can comprise a combination of the elements 7a, 7b, or 7c.

The interference phenomena between the laser beam or beams $A_i$, generated by the mixing module 7, produce the laser field forming the laser wavefront B. This laser wavefront B presents a distribution of intensities $b_i$ that depends on the phase differences among the laser beam or beams $A_i$. The laser field travels to an intensity measuring module 8 that detects the field. The intensity measuring module 8 measures the mixed intensities $b_i$ that correspond to the square module of the laser field portions $B_i$. A signal representative of these mixed intensities $b_i$ is sent towards the calculation unit 9. The intensity measuring module 8 comprises a plurality of photodetectors, the number P of which is at least three times greater than the number N of laser beams $A_i$.

In one embodiment (see FIGS. 2 and 3), the intensity measuring module 8 is arranged downstream from the mixing module 7.

In another embodiment (see FIG. 4), the intensity measuring module 8 is integrated in the mixing module 7 and photodetectors are arranged on the outer edge of the component forming the mixing module 7.

In one embodiment, the phase adjustment module 10 comprises a plurality of phase modulators arranged on the path of the laser beam or beams $A_i$.

Furthermore, the calculation unit 9 enables, from the mixing matrix M, to estimate the laser wavefront profile A, especially of the phase or phases $\varphi_i$.

In the embodiment represented in FIG. 1, the calculation unit 9 comprises:

- an allocation sub-module 11, allocating the predetermined target phase or phases $\varphi_i^c$ to the intensity laser beam or beams $A_i$, to form a target laser wavefront $\tilde{A}$. The laser beam or beams $A_i$ are determined from the intensities $a_i$ provided by the calibration module 6;
- a calculation sub-module 12, arranged downstream from the allocation sub-module 11, calculating a target image laser wavefront $\tilde{B}$ of a target image laser field comprising the target image portions $\tilde{B}_i$, from the target laser wavefront $\tilde{A}$. Information representative of the target image laser wavefront $\tilde{B}$ and information representative of the target laser wavefront $\tilde{A}$ are linked by the mixing matrix M by the relation $\tilde{B}=M.\tilde{A}$. The target image laser wavefront $\tilde{B}$ represents target image portions $\tilde{B}_i$ to which are associated target image phases $\tilde{\theta}_i$;
- an allocation sub-module 13, allocating the target image phases $\tilde{\theta}_i$ obtained from the calculation sub-module 12 arranged upstream, to the laser field portions $B_i$ whose mixed intensities $b_i$ are measured by the intensity measuring module 8, in order to form an image laser wavefront B';
- a convergence sub-module 14, enabling to obtain, by convergence, in an iterative manner, the theoretical image phases $\theta''_i$ from the target image phases $\tilde{\theta}_i$, then to allocate said theoretical image phases $\theta''_i$ to the laser field portions $B_i$, whose mixed intensities $b_i$ are measured by the intensity measuring module 8, in order to form a theoretical image laser wavefront B'';
- a calculation sub-module 15 configured to calculate a theoretical laser wavefront A'' from the theoretical image laser wavefront B'' obtained from the convergence sub-module 14 arranged upstream. Information representative of the theoretical laser wavefront A'' and information representative of the theoretical image laser wavefront B'' are linked by a generalized inverse $M^+$ of the matrix M, of dimension N×P, via the relation $A''=M^+.B''$. The theoretical laser wavefront A'' presents a theoretical phase $\varphi''_i$ associated with a theoretical laser beam $A''_i$ or theoretical phases $\varphi''_i$ associated with theoretical laser beams $A''_i$; and
- an estimation sub-module 16, estimating one or several phase correction values $\varphi_i^{cor}$, corresponding to the difference between the target phase or phases $\varphi_i^c$ and the theoretical phase or phases $\varphi''_i$ obtained from the calculation sub-module 15. This or these phase correction or values are sent to the phase adjustment module 10 by the estimation sub-module 16.

In a one embodiment, the convergence sub-module 14 enables to obtain theoretical image phases $\varphi''_i$ associated with the theoretical image laser wavefront B" by a projection method. In this embodiment, the convergence sub-module 14 comprises a determination element 17, a test element 18 and a decision element 19.

The determination element 17 enables to determine a projected laser wavefront $B_p$ of a projected laser field comprising projected portions $B_{ip}$, from the image laser wavefront B' obtained from the allocation sub-module 13. Information representative of the projected laser wavefront $B_p$ and information representative of the image laser wavefront B' are linked by the mixing matrix M and its generalized inverse $M^+$ by the relation $B_p=M.M^+.B'$. The projected laser wavefront $B_p$ is formed by the projected portions $B_{ip}$ associated with projected phases $\theta_{ip}$.

The test element 18, which follows the determination element 17, is configured here to test the deviation between the projected phases $\theta_{ip}$ and the target image phases $\tilde{\theta}_i$ obtained from the calculation sub-module 12 and to emit a signal representative of this deviation between phases. The signal is either in a first state $T_1$ if the deviation is greater than a predetermined threshold value, or in a second state $T_2$ if the deviation is smaller than or equal to the predetermined threshold value.

The decision element 19 is arranged downstream from the test element 18 and receives the signal representative of the deviation between phases. If the received signal is in the first state, the decision element 19 replaces, in the determination module 17, the target image phases $\tilde{\theta}_i$ with the projected phases $\theta_{ip}$. If the received signal is in the second state $T_2$, the decision element 19 considers the projected phases $\theta_{ip}$ as theoretical image phases $\theta''_i$ to be allocated to the laser field portions $B_i$ to form the theoretical image laser wavefront B".

In another embodiment, the phase adjustment module enables to adjust, from the phase correction value or values calculated by the calculation unit 9, the phase $\varphi_i$ of the laser beam $A_i$ or the phases $\varphi_i$ of the laser beams $A_i$ to a set of predetermined target phases $\varphi_i^c$. The phase adjustment module 10 enables to adjust the laser wavefront profile A to a desired laser wavefront profile formed by the set of predetermined target phases $\varphi_i^c$.

Furthermore, the system S can comprise a laser beam generator 1 arranged upstream from the laser wavefront profile adjustment loop by counter-reaction, which generates a master laser beam $F_m$. By way of example, the laser beam generator 1 can be an oscillator.

A laser beam splitter 2 can also be arranged upstream from the laser beam generator 1 to split the master laser beam $F_m$ into one or several elementary laser beams $f_i$ (with i=1, 2 . . . , N), presenting the same emission frequencies than the master laser beam $F_m$ and forming the wavefront A.

In a particular embodiment, the system S also comprises an amplification module 3 arranged upstream from the phase adjustment module 10. This amplification module 3 is configured to amplify the light signal of the elementary laser beam or beams $f_i$ coming from the laser beam splitter 2.

Furthermore, a sampling module 4 can be arranged in the extension of the amplification module 3. Furthermore, the sampling module can be arranged upstream from the mixing module 7. By way of an example, the sampling module 4 comprises one or several splitting blades that, on one hand, let the larger part of the elementary beam or beams $f_i$ travel to one or several outlets 5 of the laser system S, and, on the other hand, sample respectively one or several parts of elementary laser beams $f_i$ to form one or several laser beams $A_i$. The sampling module 4 does not act on the phases. The phase $\varphi_i$ of the elementary laser beam $f_i$ or the phases $\varphi_i$ of the elementary laser beams $f_i$ are therefore identical, respectively, to the phase $\varphi_i$ of the laser beam $A_i$ or to the phases $\varphi_i$ of the laser beams $A_i$. The laser beam or beams $A_i$ therefore form a wavefront representative of the wavefront A.

Figure 5:
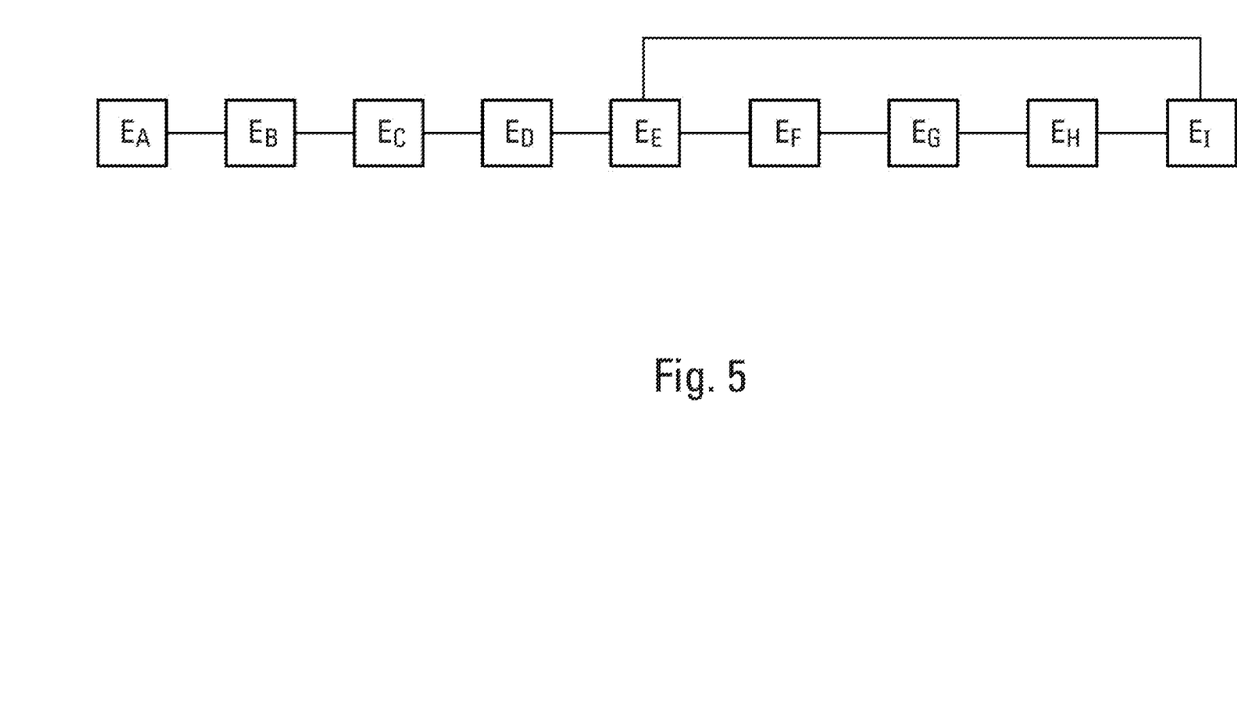
FIG. 5 is a synoptic scheme of an embodiment of the method.
Figure 6:
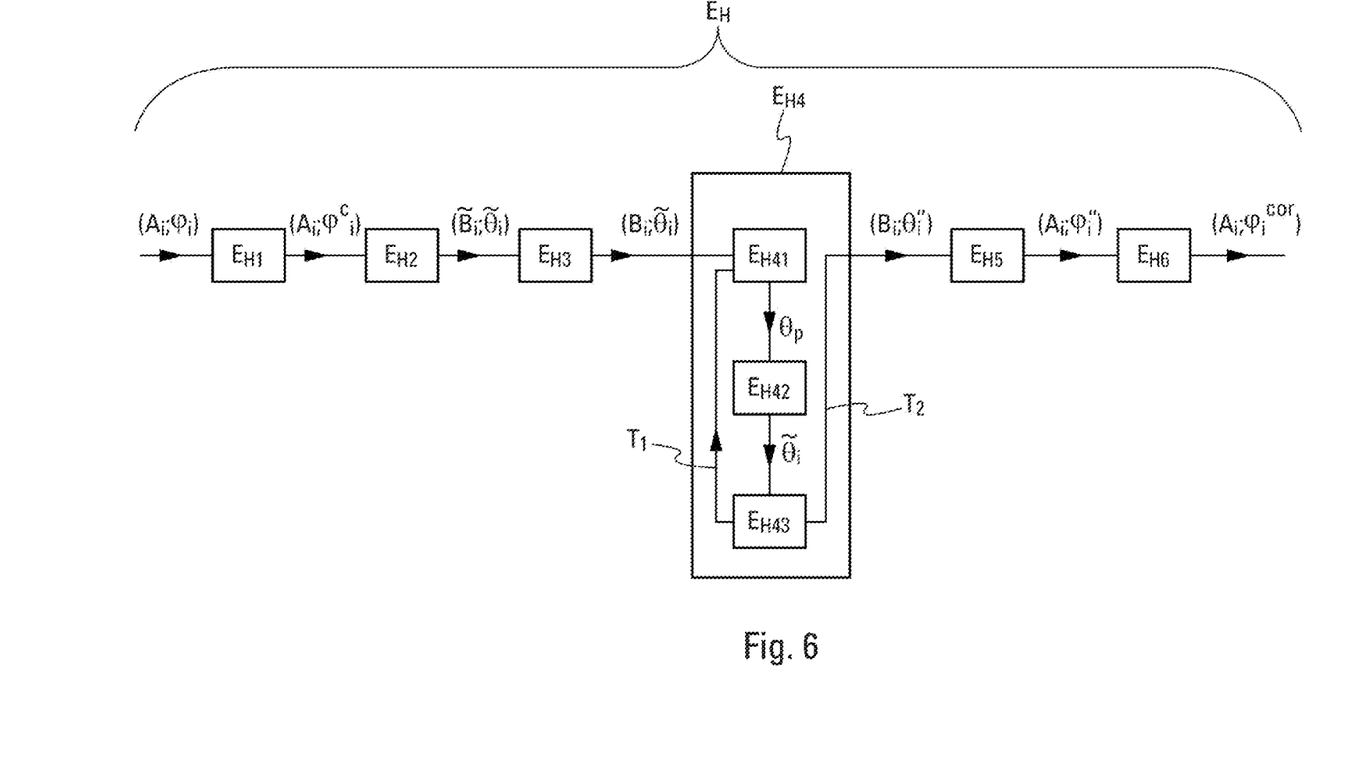
FIG. 6 is a synoptic scheme of a phase correction calculation step according to one embodiment of the method.

The system S, as described above, implements, automatically, the general steps of the method represented in FIGS. 5 and 6.

During a step $E_A$ whereby a laser beam is generated, the laser beam generator 1 generates the master laser beam $F_m$, which, in a laser beam splitting step $E_B$, is split by the laser beam splitter 2, into one or several elementary laser beams $f_i$, presenting one or several frequencies identical to that of the master laser beam $F_m$.

An amplification step $E_C$ then enables to increase the light signal of the elementary laser beams $f_i$, emitted in the previous step whereby a laser beam $E_B$ is split. The elementary laser beam or beams $f_i$ amplified by the amplification module 3 travel through the sampling module 4. During a sampling step $E_E$, after the amplification step $E_C$, a part of the elementary laser beam or beams $f_i$ is sampled, to form respectively one or several laser beams A. The laser beam or beams $A_i$ have one or several phases $\varphi_i$ identical to that of the elementary laser beam or beams $f_i$. The laser beam or beams $A_i$ form a random laser wavefront A, whose profile is to be adjusted to a desired laser wavefront.

During a calibration step $E_D$, the intensities $a_i$ of the laser beam or beams $A_i$ are transmitted by the calibration measurement module 6 towards the calculation unit 9.

As represented in FIG. 5, the method comprises an iterative succession of steps. Thus, during a mixing step $E_F$, the laser wavefront A formed by the laser beam or beams $A_i$ travels through the mixing module 7, which generates interference phenomena among the laser beam or beams $A_i$. These interferences create a laser field forming a new laser wavefront B. This wavefront B has mixed phases $\theta_i$. The laser field travels to the intensity measuring module 8 that detects laser field portions B. During an intensity measuring step $E_G$, mixed intensities $b_i$ of these laser field portions $B_i$ are measured. The number P of detected laser field portions $B_i$ corresponds to the number of photodetectors of the intensity measuring module 8. It can be at least three times greater than the number N of laser beams $A_i$.

From the set of predetermined target phases $\varphi_i^c$, as well as the intensities $a_i$ and the mixed intensities $b_i$, one or several phase correction values $\varphi_i^{cor}$ of the phase $\varphi_i$ of the laser beam $A_i$ or of the phases $\varphi_i$ of the laser beams $A_i$ are calculated by the calculation unit 9 in a phase correction calculation step $E_H$.

During a phase adjustment step $E_I$, the phase adjustment module 10 applies the phase correction value or values $\varphi_i^{cor}$, obtained in the previous step $E_H$, to the phase $\varphi_i$ of the laser beam $A_i$ or to the phases $\varphi_i$ of the laser beams $A_i$. This adjustment step $E_I$ enables to bring the laser wavefront profile A formed by the laser beams $A_i$ closer to the desired laser wavefront profile represented by the set of predetermined target phases $\varphi_i^c$. The previous steps are repeated until obtaining a wavefront profile A adjusted to the desired laser wavefront profile.

In one particular embodiment represented in FIG. 6, the phase correction calculation step $E_H$ comprises a succession of sub-steps. Therefore, in an allocation sub-step $E_{H1}$ implemented by the allocation sub-module 11, the predetermined target phase or phases $\varphi_i^c$ are allocated to the laser beam or beams $A_i$, by replacing their phases $\varphi_i$, which are still unknown at this point. The laser beam or beams $A_i$ with phases $\varphi_i^c$ form a target laser wavefront Ã.

A target image laser wavefront $\tilde{B}$ of a target image laser field comprising target image portions $\tilde{B}_i$ is then calculated from the target laser wavefront $\tilde{A}$ and the mixing matrix M. Information representative of the target laser wavefront $\tilde{A}$ is represented by a vector of dimension N, of which each element is a laser beam value $A_i$. The mixing matrix M is a matrix of dimension P×N. During a calculation sub-step $E_{H2}$ implemented by the calculation sub-module 12, information representative of the target image laser wavefront $\tilde{B}$, represented by a vector of dimension P, of which each element is a value of a target image portion $\tilde{B}_i$, is calculated by the relation matrix $\tilde{B}=M.\tilde{A}$. The target image phases $\tilde{\theta}_i$, associated with the target image portions $\tilde{B}_i$, thereby obtained are, in an allocation sub-step $E_{H3}$ implemented by the allocation sub-module 13, allocated to the laser field portions $B_i$ whose mixed intensities $b_i$ were measured in the intensity measuring step $E_G$. The target image phases $\tilde{\theta}_i$ represent the phases of the wavefront after the mixing module if the phases of the initial wavefront A of measured intensities $a_i$ are the predetermined target phases $\varphi_i^c$ of the desired wave profile.

The target image phases $\tilde{\theta}_i$ are then used as initial values in a convergence sub-step $E_{H4}$ implemented by the convergence sub-module 14. The target image phases $\tilde{\theta}_i$ are then modified by an iterative process, until achieving their convergence towards values that are called theoretical image phases $\theta"_i$. These theoretical image phases $\theta"_i$ are then allocated to the laser field portions $B_i$, thereby forming a theoretical image laser wavefront B".

From this theoretical image laser wavefront B", whose representative information is represented by a vector of dimension P and the generalized inverse $M^+$ of the mixing matrix of dimension N×P, in a calculation sub-step $E_{H5}$ implemented by the calculation sub-module 15, a theoretical laser wavefront A" is calculated, whose representative information is represented by a vector of dimension N, by the relation $A"=M^+.B"$.

In an estimation sub-step $E_{H6}$, implemented by the estimation sub-module 16, the phase correction value or values $\varphi_i^{cor}$ are estimated. This or these phase correction values $\varphi_i^{cor}$ correspond to the difference between the predetermined target phase or phases $\varphi_i^c$ and the theoretical phase or phases $\varphi"_i$ forming the theoretical laser wavefront A" calculated in the calculation sub-step $E_{H5}$.

As explained above, the phase correction value or values $\varphi_i^{cor}$ change, during the phase adjustment step $E_I$, the phase $\varphi_i$ of the laser beam $A_i$ or the phases $\varphi_i$ of the laser beams $A_i$, enabling to bring the laser wavefront profile A closer to the desired laser wavefront profile. The phase correction value or values $\varphi_i^{cor}$ also change, indirectly, the laser field of wavefront B, and therefore the mixed intensities $b_i$. The steps $E_F$ to $E_I$, as well as the sub-steps that they include, are therefore repeated until the adjustment of the wavefront profile A to the desired laser wavefront profile is achieved. This adjustment corresponds, after convergence, to obtaining a stationary laser field.

Alternatively, the phase adjustment step $E_I$ enables to modify the phase of the elementary laser beam $f_i$, or the phases of the elementary laser beams $f_i$, the phase $\varphi_i$ of the laser beam $A_i$ or the phases $\varphi_i$ of the laser beams $A_i$ being identical to that of the elementary beam or beams $f_i$.

In a particular embodiment, the theoretical image phases $\theta"_i$ are obtained after the convergence sub-step $E_{H4}$, by an iterative projection method.

As represented in FIG. 6, the convergence sub-step $E_{H4}$ can comprise a determination step $E_{H41}$ implemented by the determination element 17, during which a laser wavefront $B_p$ projected from a projected laser field comprising the projected portions $B_{ip}$ is calculated. This projected laser wavefront $B_p$ is obtained from the image laser wavefront B', whose representative information is represented by a vector of dimension P and calculated in the allocation sub-step $E_{H3}$. The successive application of the generalized inverse $M^+$ of the mixing matrix and then of the mixing matrix M to the vector of dimension P representative of the image laser wavefront B' enables to obtain a vector of dimension P representing the projected laser wavefront $B_p$. The matrix relationship between the projected laser wavefront and the image laser wavefront is written $B_p=M.M^+.B'$. The projected laser wavefront $B_p$ thereby obtained is formed by the projected portions $B_{ip}$ associated with projected phases $\theta_{ip}$.

During a test step $E_{H42}$ implemented by the test element 18, the deviation between the projected phases $\theta_{ip}$, obtained in the previous determination step $E_{H41}$, and the target image phases $\tilde{\theta}_i$, obtained in the calculation sub-step $E_{H2}$, is compared with a predetermined threshold value that can be infinitesimal. The result of this test generates a signal that is analysed in a decision step $E_{H43}$ implemented by the decision element 19. The signal can either be in a first state $T_1$, or in a second state $T_2$.

As long as the signal sent to the decision element 19 is in the first state $T_1$, the deviation between the projected phases $\theta_{ip}$ and the image phases $\tilde{\theta}_i$ is above the predetermined threshold value. The decision step $E_{H43}$ consists of allocating the projected phases $\theta_{ip}$ to the laser field portions $B_i$ so as to form a new image laser wavefront B'. This new image front B' is used in the step whereby the next iteration is determined in order to calculate new projected phases $\theta_{ip}$.

When the deviation between the projected phases $\theta_{ip}$ and the image phases $\tilde{\theta}_i$ is smaller than or equal to the predetermined threshold value, it is deemed that the projected phases $\theta_{ip}$ have converged towards stable values. The signal sent to the decision element 19 is in the second state $T_2$. The decision step $E_{H43}$ then consists of defining the projected phases $\theta_{ip}$ as theoretical image phases $\theta"_i$. These theoretical image phases $\theta"_i$ are then allocated to the laser field portions $B_i$ whose mixed intensities $b_i$ were measured in the intensity measuring step $E_G$ to form the theoretical image laser wavefront B". As explained above, the theoretical image laser wavefront B" is used, in the calculation sub-step $E_{H5}$, to calculate the theoretical laser wavefront A".

While illustrative embodiments have been illustrated and described, it will be appreciated that various changes can be made therein without departing from the spirit and scope of the disclosure.

The invention claimed is:

1. Method for adjusting a laser wavefront profile formed by at least one laser beam ($A_i$), to a desired laser wavefront profile, the laser beam or beams ($A_i$) presenting random phases ($\varphi_i$) and intensities ($a_i$), said laser wavefront formed by the laser beam or beams ($A_i$) corresponding to a first laser wavefront (A), said method comprising the following iterative succession of steps:
  a mixing step ($E_F$) of the laser beam or beams ($A_i$), implemented by a mixing module, consisting of generating, from interference phenomena between the laser beam or beams ($A_i$), a laser field forming a second laser wavefront (B);
  an intensity measuring step ($E_G$), implemented by an intensity measuring module, consisting of measuring the mixed intensities ($b_i$) of the laser field comprising laser field portions ($B_i$);
  a phase correction calculation phase ($E_H$), implemented by a calculation unit, consisting of calculating one or several phase correction values ($\varphi_i^{cor}$) of the phase ($\varphi_i$)

of the laser beam ($A_i$) or the phases ($\varphi_i$) of the laser beams ($A_i$), from the intensities ($a_i$) of the laser beam or beams ($A_i$), from the mixed intensities ($b_i$) measured in the intensity measuring step ($E_G$), and from one or several predetermined target phases ($\varphi_i^c$) forming the desired laser wavefront profile; and a phase adjustment step ($E_I$), implemented by a phase adjustment module, consisting of applying the phase correction value or values ($\varphi_i^{cor}$), obtained in the phase correction calculation step ($E_H$), to the phase ($\varphi_i$) of the laser beam ($A_i$) or to the phases ($\varphi_i$) of the laser beams ($A_i$), in order to adjust the first laser wavefront profile (A) to the desired laser wavefront profile.

2. Method according to claim 1,
characterized in that the phase correction calculation step ($E_H$) comprises the following successive sub-steps:
a first allocation sub-step ($E_{H1}$), implemented by a first allocation sub-module, consisting, in order to form a target laser wavefront ($\tilde{A}$), of allocating the predetermined target phase or phases ($\varphi_i^c$) to the laser beam or beams ($A_i$);
a first calculation sub-step ($E_{H2}$), implemented by a first calculation sub-module, consisting of calculating a target image laser wavefront ($\tilde{B}$) of a target image laser field comprising target image portions ($\tilde{B}_i$), from a target laser wavefront ($\tilde{A}$) and a mixing matrix (M) characterising the mixing module, in order to obtain the target image phases ($\tilde{\theta}_i$) associated with the target image portions ($\tilde{B}_i$);
a second allocation sub-step ($E_{H3}$), implemented by a second allocation sub-module, consisting of allocating the target image phases ($\tilde{\theta}_i$) to the laser field portions ($B_i$) whose mixed intensities ($b_i$) are measured in the intensity measuring step ($E_G$), in order to form an image laser wavefront (B');
a convergence sub-step ($E_{H4}$), implemented in an iterative manner by a convergence sub-module, consisting of obtaining, by convergence, the theoretical image phases ($\theta''_i$), from the target image phases ($\tilde{\theta}_i$) and the mixed intensities ($b_i$), and in allocating said theoretical image phases ($\theta''_i$) to the laser field portions ($B_i$) in order to form a theoretical image laser wavefront (B");
a second calculation sub-step ($E_{H5}$), implemented by a second calculation sub-module, consisting of calculating a theoretical laser wavefront (A"), from the theoretical image laser wavefront (B") and a generalized inverse ($M^+$) of the mixing matrix, in order to determine one or several theoretical phases ($\varphi''_i$) associated with one or several theoretical laser beams ($A''_i$) forming the theoretical laser wavefront (A"); and
an estimation sub-step ($E_{H6}$), implemented by an estimation sub-module, consisting of estimating one or several phase correction values ($\varphi_i^{cor}$), corresponding to the difference between the target phase or phases ($\varphi_i^c$) and the theoretical phase or phases ($\varphi''_i$).

3. Method according to claim 2,
characterized in that the convergence sub-step ($E_{H4}$), implemented by the convergence sub-module, consists of implementing a projection method comprising an iterative succession of the following steps:
a determination step ($E_{H41}$), implemented by a determination element, consisting of determining a projected laser wavefront ($B_p$) of a projected laser field comprising projected portions ($B_{ip}$), from the image laser wavefront (B'), the mixing matrix (M) and the generalized inverse ($M^+$) of the mixing matrix, in order to obtain projected phases ($\theta_{ip}$) associated to the projected portions ($B_{ip}$);
a test step ($E_{H42}$), implemented by a test element, consisting of testing the deviation between the projected phases ($\theta_{ip}$) and the target image phases ($\tilde{\theta}_i$), and in producing a representative signal presenting itself:
either in a first state ($T_1$), if the deviation is greater than a predetermined threshold value;
or in a second state ($T_2$), if the deviation is equal to or smaller than the predetermined threshold value;
a decision step ($E_{H43}$), implemented by a decision element, consisting:
if the produced signal presents itself in the first state ($T_1$), of replacing, in the determination step ($E_{H41}$) of the subsequent iteration, the target image phases ($\tilde{\theta}_i$) with the projected phases ($\theta_{ip}$); or
if the produced signal is in the second state ($T_2$), in considering the projected phases ($\theta_{ip}$) as theoretical image phases ($\theta''_i$) to be allocated to the laser field portions ($B_i$) to form the theoretical image laser wavefront (B").

4. Method according to claim 1,
characterised in that it comprises a calibration step ($E_D$), implemented by a calibration module, consisting of determining the intensities ($a_i$) of the laser beam or beams ($A_i$) forming the first laser wavefront (A).

5. Method according to claim 1,
characterized in that it also comprises a laser beam generation step ($E_A$), implemented by a laser beam generator, the laser beam generation step ($E_A$) consisting of generating a master laser beam ($F_m$) before a beam splitting step ($E_B$), implemented by a laser beam splitter, consisting of splitting the master laser beam ($F_m$) into one or several elementary laser beams ($f_i$) forming the first laser wavefront (A).

6. Method according to claim 1,
characterized in that it also comprises an amplification step ($E_C$), implemented by an amplification module, consisting of amplifying the elementary laser beam or beams ($f_i$).

7. Method according to claim 1,
characterized in that it also comprises a sampling step ($E_E$), implemented by a sampling module, consisting of sampling a part of the elementary laser beam or beams ($f_i$) forming the first laser wavefront (A), said sampled part of the elementary laser beam or beams ($f_i$) representing the laser beam or beams ($A_i$) forming the wavefront representative of the first laser wavefront (A).

8. System for adjusting a laser wavefront profile formed by at least one laser beam ($A_i$), to a desired laser wavefront, the laser beam or beams ($A_i$) presenting random phases ($\varphi_i$) and intensities ($a_i$), said laser wavefront formed by the laser beam or beams ($A_i$) corresponding to a first laser wavefront (A), said system comprising:
a mixing module, configured to generate, from interference phenomena between the laser beam or beams ($A_i$), a laser field forming a second laser wavefront (B);
an intensity measuring module, configured to measure the mixed intensities ($b_i$) of the laser field comprising laser field portions ($B_i$);
a calculation unit, configured to calculate one or several phase correction values ($\varphi_i^{cor}$) of the phase ($\varphi_i$) of the laser beam ($A_i$) or the phases ($\varphi_i$) of the laser beams ($A_i$), from the intensities ($a_i$) of the laser beam or beams ($A_i$), from the mixed intensities ($b_i$) measured by the intensity measuring module, and from one or several predetermined target phases ($\varphi_i^c$) forming the profile of the desired laser wavefront profile; and a phase adjustment module, configured to apply the phase correction value or values ($\varphi_i^{cor}$), obtained by the calculation unit, to the phase ($\varphi_i$) of the laser beam ($A_i$) or to the phases ($\varphi_i$) of the laser beams ($A_i$), in order to adjust the profile of the first laser wavefront (A) to the desired laser wavefront profile.

9. System according to claim 8, characterized in that the calculation unit comprises the following modules:

a first allocation sub-module, configured to allocate the predetermined target phase or phases ($\varphi_i^c$) to the intensity laser beam or beams ($A_i$) of intensities ($a_i$), in order to form a target laser wavefront ($\tilde{A}$);

a first calculation sub-module, configured to calculate a target image laser wavefront ($\tilde{B}$) of a target image laser field comprising target image portions ($\tilde{B}_i$), from the target laser wavefront ($\tilde{A}$) and a mixing matrix (M), in order to obtain the target image phases ($\tilde{\theta}_i$) associated with the target image portions ($\tilde{B}_i$);

a second allocation sub-module configured to allocate target image phases ($\tilde{\theta}_i$) to the laser field portions ($B_i$) whose mixed intensities ($b_i$) are measured by the intensity measuring module, in order to form an image laser wavefront (B');

a convergence sub-module, configured to obtain, by convergence, the theoretical image phases ($\theta''_i$), from the target image phases ($\tilde{\theta}_i$) and the mixed intensities ($b_i$), and to allocate said theoretical image phases ($\theta''_i$) to the laser field portions ($B_i$) in order to form a theoretical image laser wavefront (B");

a second calculation sub-module, configured to calculate a theoretical laser wavefront (A") from the theoretical image laser wavefront (B") and a generalized inverse ($M^+$) of the mixing matrix, in order to determine one or several theoretical phases ($\varphi''_i$) associated with one or several theoretical laser beams ($A''_i$) forming the theoretical laser wavefront (A"); and an estimation sub-module, configured to estimate one or several phase correction values ($\varphi_i^{cor}$), corresponding to the difference between the target phase or phases ($\varphi_i^c$) and the theoretical phase or phases ($\varphi''_i$).

10. System according to claim 9, characterized in that the convergence sub-module is configured to implement a projection method, said convergence sub-module comprising:

a determination element, configured to determine a projected laser wavefront ($B_p$) of a projected laser field, comprising projected portions ($B_{ip}$), from the image laser wavefront (B'), the mixing matrix (M) and the generalized inverse ($M^+$) of the mixing matrix, in order to obtain projected phases ($\theta_{ip}$) associated with the projected portions ($B_{ip}$);

a test element, configured to test the deviation between the projected phases ($\theta_{ip}$) and the target image phases ($\tilde{\theta}_i$), and to emit a representative signal presenting itself:

either in a first state ($T_1$), if the deviation is greater than a predetermined threshold value;

or in a second state ($T_2$), if the deviation is equal to or smaller than the predetermined threshold value;

a decision element, configured:

if the received signal is in the first state ($T_1$), to replace, in the determination module, the target image phases ($\tilde{\theta}_i$) with the projected phases ($\theta_{ip}$); or if the received signal is in the second state ($T_2$), to consider the projected phases ($\theta_{ip}$) as theoretical image phases ($\theta''_i$) to be allocated to the laser field portions ($B_i$) to form the theoretical image laser wavefront (B").

11. System according to claim 8, characterized in that it comprises a calibration module configured to determine the intensities ($a_i$) of the laser beam or beams ($A_i$) forming the first laser wavefront (A).

12. System according to claim 8, characterized in that it comprises a laser beam generator configured to generate a master laser beam ($F_m$) and a laser beam splitter configured to split said master laser beam ($F_m$) into one or several elementary laser beams ($f_i$) forming the first laser wavefront (A).

13. System according to claim 8, characterized in that it comprises an amplification module of the elementary laser beam or beams ($f_i$), and a sampling module, said sampling module being configured to sample a part of the elementary laser beam or beams ($f_i$) forming the first laser wavefront (A), said sampled part of the elementary laser beam or beams ($f_i$) representing the laser beam or beams ($A_i$) forming a laser wavefront representative of the first laser wavefront (A).

14. System according to claim 8, characterized in that the intensity measuring module comprises a number (P) of photodetectors at least three times greater than the number (N) of laser beams ($A_i$).

15. System according to claim 8, characterized in that the intensity measuring module is integrated in the mixing module.

16. System according to claim 8, characterized in that the mixing module comprises a diffracting element, a refracting element, one or several diffusing elements, or a combination of these elements.

* * * * *